Oct. 25, 1960     E. G. HILL     2,957,729
BOOSTER BRAKE MECHANISM
Filed Sept. 7, 1955            5 Sheets-Sheet 4

INVENTOR.
EDWARD GOVAN HILL
BY
ATTORNEY

United States Patent Office 2,957,729
Patented Oct. 25, 1960

2,957,729

BOOSTER BRAKE MECHANISM

Edward Govan Hill, Birmingham, Mich., assignor to Kelsey-Hayes Company, a corporation of Delaware Filed Sept. 7, 1955, Ser. No. 532,944

4 Claims. (Cl. 303—24)

This invention relates to a booster brake mechanism. In my copending application Serial No. 827,193, filed July 15, 1959, I have disclosed and claimed a novel type of booster brake mechanism wherein separate motor units are employed for separately displacing fluid under pressure to the front wheel brake cylinders and the rear wheel brake cylinders, both motor units being of the vacuum-suspended type. In the copending application, a conventional pedal operable master cylinder is employed and the fluid displaced from such master cylinder performs two functions, namely, to operate the valve mechanism for the motor units and to assist the motor unit for the front wheel brakes in applying braking forces to the front wheel cylinders. The system functions in such a manner that the application of the rear wheel brakes depends solely on the motor unit associated therewith to minimize the locking of the rear wheels of the vehicle, and the system has associated therewith means automatically operative when emergency stops are made at relatively high vehicle speeds to limit the energization of the rear brake motor to insure against the locking of the rear wheels.

In the copending application of David T. Ayers, Jr., Serial No. 439,674, filed June 28, 1954, now Patent No. 2,805,550, granted September 10, 1957, there is disclosed a novel type of booster brake mechanism in which a bellows-type air-suspended motor is employed for assisting the operator in transmitting forces to a single master cylinder from which fluid is displaced into all of the brake cylinders. Such a system embodies numerous practical advantages. For example, the system is economical to manufacture and easily installed with respect to the fire wall of the vehicle and is so constructed that upon a failure of power in the booster motor, the pressure movable parts thereof remain stationary while the operator effects brake application solely by pedal generated forces. This arrangement is such that the forces generated in the brake pedal are more advantageously utilized in applying the brakes since the operator is not called upon to effect movement of the pressure responsive unit of the booster motor or to compress the relatively heavy return spring associated therewith.

An important object of the present invention is to provide a booster brake system for motor vehicles wherein separate master cylinders are employed for the front and rear brake cylinders and wherein the motors are of the economical air-suspended bellows type.

A further object is to provide an apparatus of the character referred to wherein a single valve mechanism is employed for controlling differential pressures for operating a motor associated with the brake pedal and cooperating therewith for generating master cylinder pressures for applying the front wheel brakes, and to connect such a motor to a second differential pressure motor of the air-suspended type which operates solely through its own energization to generate pressures in a second master cylinder to apply the rear wheel brakes.

A further object is to provide such a system wherein the booster motor for the rear wheel brakes may be arranged at any desired point where there is space available and which motor has its internal pressures controlled by a pipe line leading to and communicating with the interior of the motor for the front wheel brakes, thus greatly facilitating installation and providing for a momentary time lag between the operation of the motor for the front wheel brakes and the motor for the rear wheel brakes, thus insuring that the front wheel brakes are applied at least as early as the rear wheel brakes to assist in minimizing any chance, under normal average braking conditions, of locking the rear wheels of the vehicle.

A further object is to provide such a system wherein the pipe line between the two motors is provided with a normally open valve adapted to be closed by a solenoid connected thereto, and to provide means responsive to a predetermined rate of vehicle deceleration for energizing the solenoid to greatly limit energization of the motor for the rear wheel cylinders, thus assuring the maintenance of traction of the rear wheels with the road without any chance that the rear wheels will be locked and thus slide on the highway.

Other objects and advantages of the invention will become apparent in the course of the following description.

In the drawings I have shown one embodiment of the invention. In this showing.

The pedal and the operating mechanism for the front wheel brakes have been shown in the positions in which they are preferably installed on a motor vehicle. The specific location of the parts associated with the rear wheel brakes is unimportant since these parts of the system can be installed in any suitable or convenient place where space is available.

Figure 1:
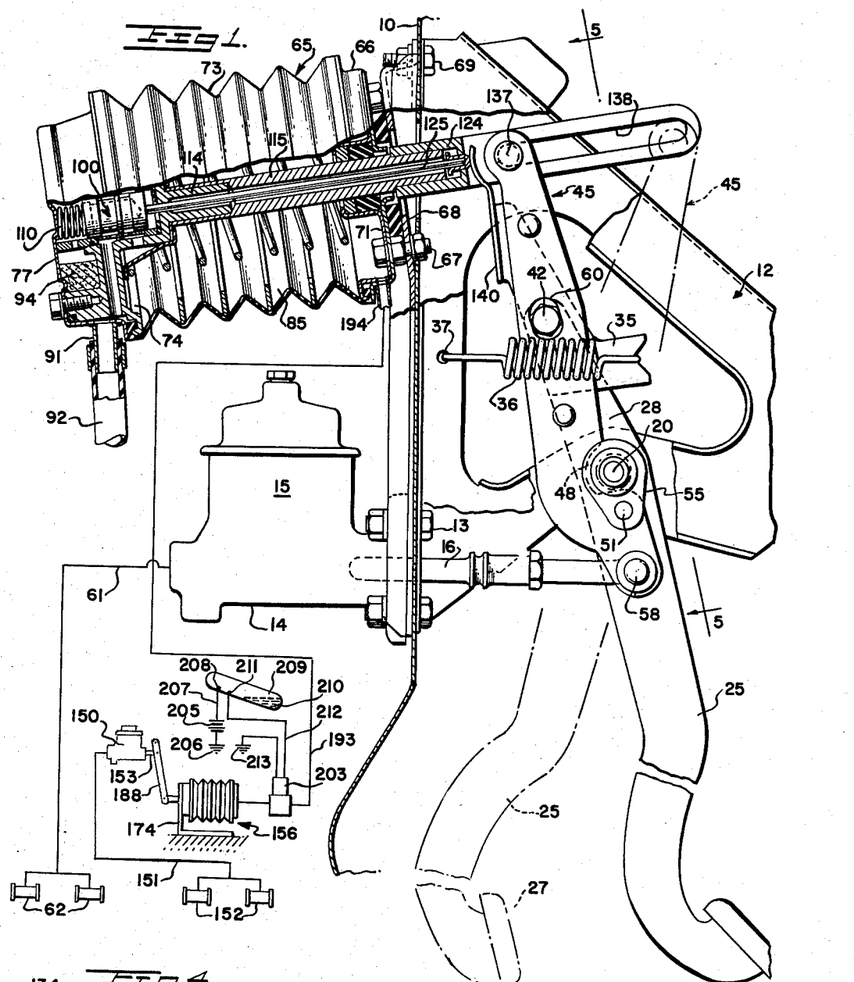
Figure 1 is a side elevation of the aparatus, parts being broken away and parts being shown in section, and with the portion of the mechanism associated with the rear wheel brake cylinders diagrammatically illustrated.
Figure 2:
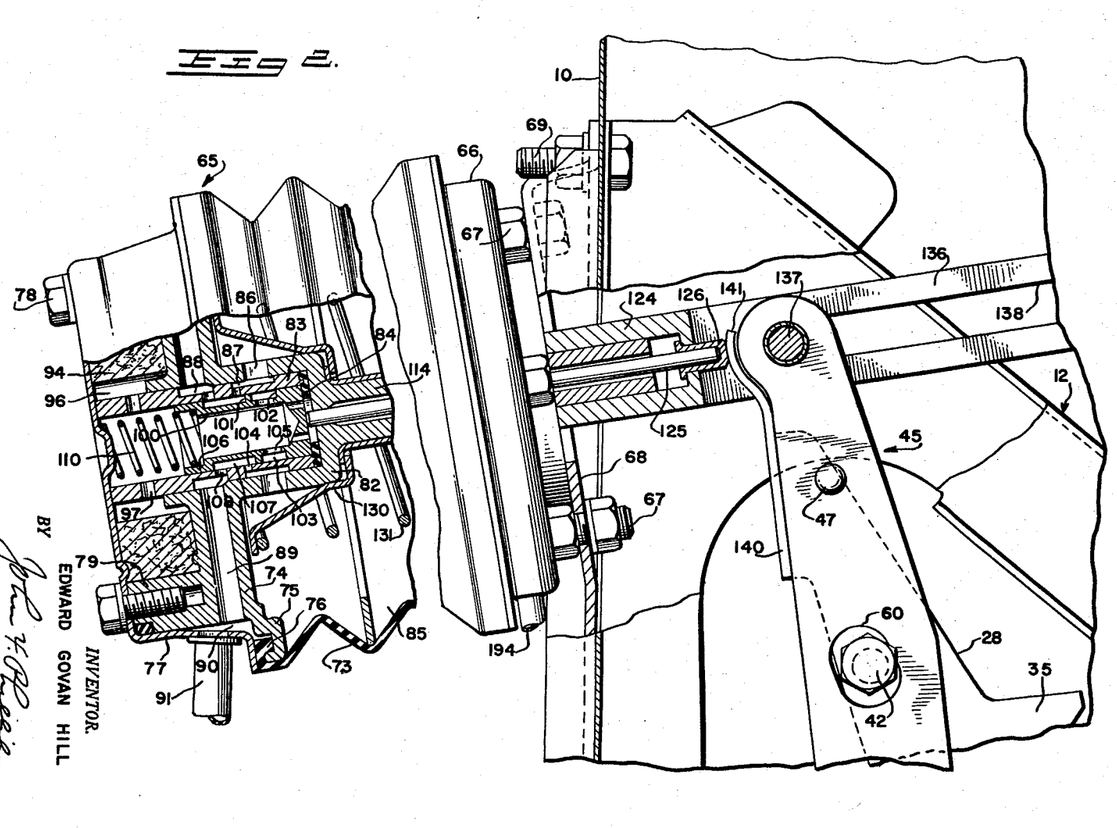
Figure 2 is an enlarged fragmentary side elevation of the upper portion of the apparatus, parts being broken away and parts being shown in section, and with the parts of the apparatus shown in normal inoperative positions.
Figure 3:
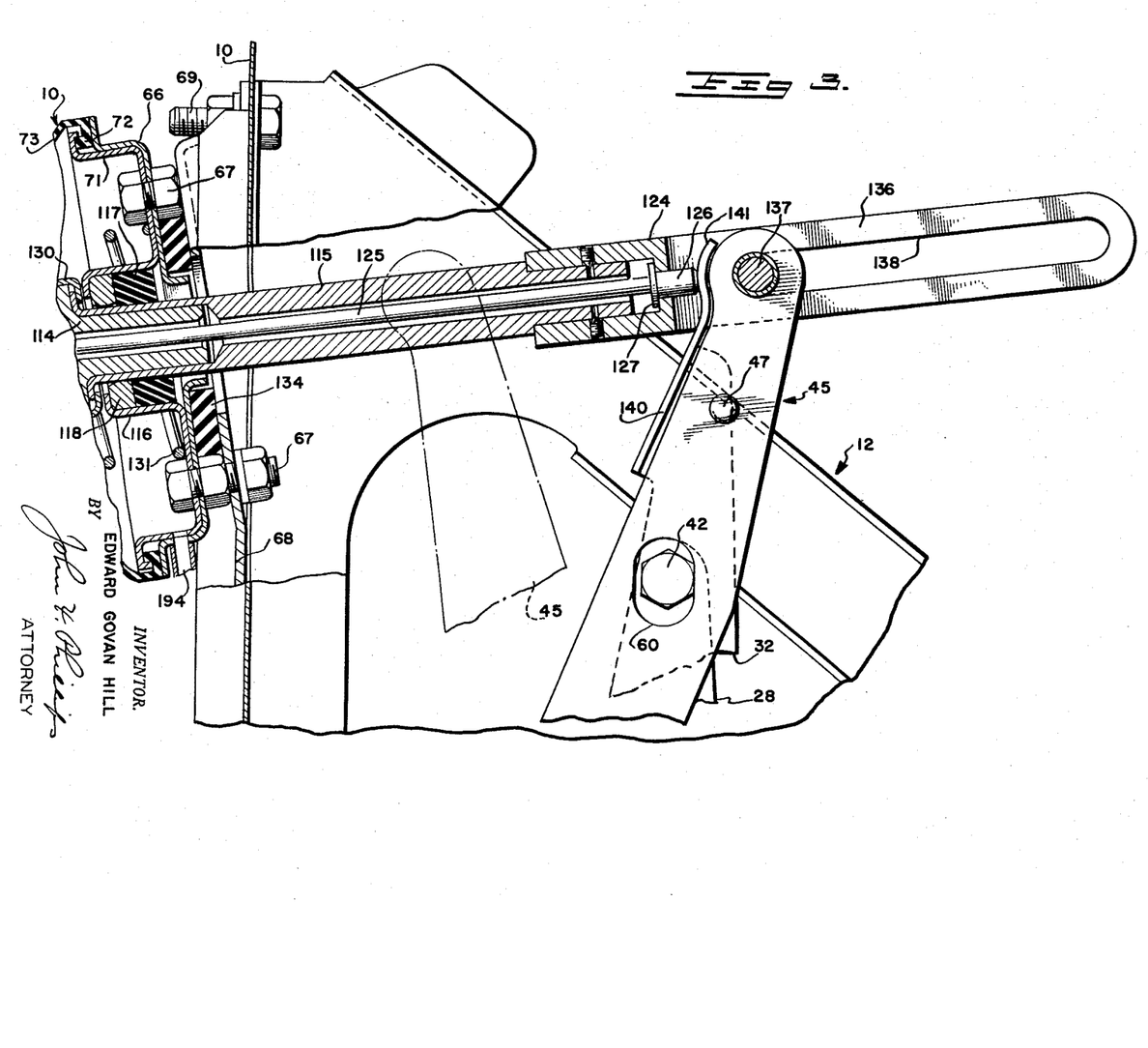
Figure 3 is a similar view showing parts of the apparatus in solid lines in the positions they will occupy when at least the front wheel brakes are fully applied.

In Figures 1, 2 and 3 there is illustrated the usual fire wall 10 of a motor vehicle. Rearwardly of the fire wall and fixed thereto is a supporting bracket 12, which bracket is generally triangular as shown in Figure 1. This type of bracket is now conventional on certain types of motor vehicles. The bracket is secured at its lower portion to the fire wall 10 by bolts 13 which serve also to secure in position a conventional master cylinder 14 having a reservoir 15 and a conventional fluid displacing piston (not shown) operated in a manner to be described by a push rod 16.

Figures 5, 6:
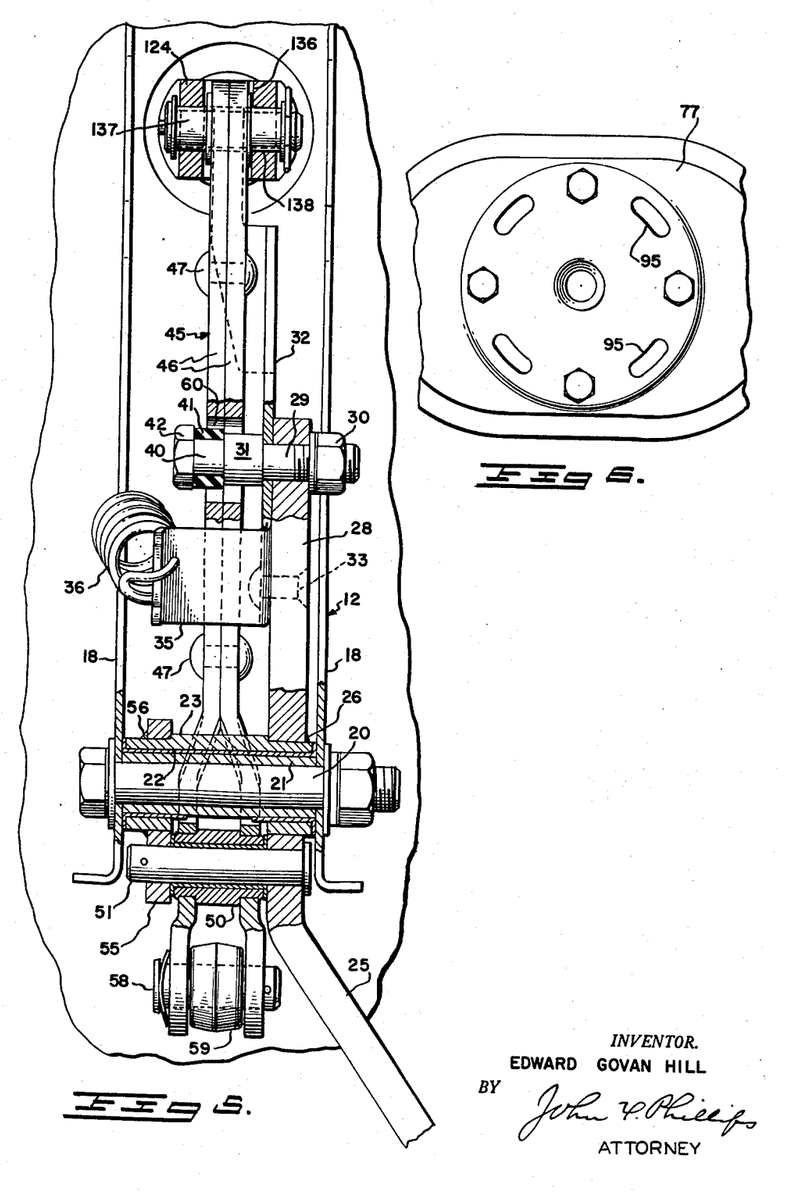
Figure 5 is an enlarged sectional view on line 5—5 of Figure 1, parts being shown in elevation.
Figure 6 is a fragmentary face view of a portion of an air cleaner cap and associated elements.

The bracket 12 comprises spaced parallel side walls 18 having arranged therebetween elements to be described for operating and controlling the apparatus. Referring to Figure 5, a shaft 20 in the form of a relatively heavy bolt passes through the side walls of the bracket and is surrounded by a sleeve 21 seated at its ends against the bracket walls 18. Around the sleeve 21 is arranged a bushing 22 surronuded in turn by a rocker sleeve 23 cut away at the bottom thereof as in Figure 5. A pedal lever 25 surrounds the sleeve 23 and is preferably welded thereto as at 26 (Figure 5). The lower end of the pedal lever is provided with a conventional pedal pad 27. Above the shaft 20 the pedal lever is provided with an operating arm 28 through which projects a reduced end of a bolt 29 having a nut 30 threaded thereon. The bolt 29 is provided with an intermediate head 31 seating against a bracket 32 to clamp the latter to the lever arm 28. Below the bolt 29 the bracket 32 is preferably riveted as at 33 to the lever arm 28. It will be apparent, therefore, that the brake lever 25 and bracket 32 rock as a unit about the axis of the shaft 20. A lateral projection 35 is formed on the lower end of the bracket 32 and one end of a return spring 36 is connected to such projection. The other end of the spring is connected as at 37 to one wall 18 of the bracket 12.

To the left of the head 31 (Figure 5) the bolt 29 is provided with a shank 40 slightly eccentric to the body of the bolt 29 and surrounded by a resilient sleeve 41 maintained in position by a head 42 on the bolt 29. The eccentricity of the shank 40 provides for an adjustment between the bolt 29 and other elements to be described and forms per se no part of the present invention.

A power or reaction lever 45, preferably made up of complementary bars 46, is arranged between the bracket walls 18, the two members 46 being riveted or otherwise secured together as at 47. The lower ends of the members 46 diverge and are arched as at 48, as shown in dotted lines in Figure 1, to pass around the sleeve 23 without engaging thereagainst. Below the sleeve 23 the members 46 carry a thimble 50 (Figure 5) rotatable on a pivot pin 51. One end of this pin passes through the pedal lever 25 while the other end passes through a plate 55 surrounding the sleeve 23 and preferably welded thereto as at 56 whereby it is fixed with respect to the pedal lever 25 to move therewith.

At their lower extremities, the members 46 are pivoted as at 58 to a boss 59 carried by the adjacent end of the master cylinder push rod 16. The lever 45 transmits brake applying forces through the rod 16 to the master cylinder piston and is slotted as at 60 to receive the bushing 41. This bushing serves to limit relative movement between the levers 25 and 45.

The master cylinder 14 serves to supply hydraulic braking pressures solely to the front wheels of the vehicle, and to this end is connected by a line 61 to the front wheel brake cylinders 62 (Figure 1).

A fluid pressure motor for the front wheel brakes is indicated as a whole by the numeral 65. This motor comprises a stationary head 66 secured by bolts 67 to a bracket 68 fixed to the fire wall 10. The lower end of this bracket is secured in position by the bolts 13 while the upper end of the bracket is fixed to the fire wall by bolts 69. A retaining ring 71 is fixed to the head 66 by the bolts 67 and fixes with respect to the head 66 a bead 72 at one end of a bellows 73. This bellows forms the body of the motor 65.

The other end of the bellows 73 is fixed to a movable head 74. This head is preferably die-cast and includes a peripheral flange 75 against which seats a bead 76 formed on the adjacent end of the bellows 73. The bead 76 is retained in position by a sheet-metal cap 77 secured to the head 74 by screws 78 threaded in bosses 79 integral with the head 74. It will become apparent that the head 74 forms the pressure responsive element of the motor. An integral axial extension 82 is formed on the head 74 and forms a valve housing in which is arranged a valve sleeve 83 engaging at one end against a resilient washer 84. The other end of the valve sleeve 83 is engaged and fixed in position by the cap 77.

The space between the two motor heads 66 and 74 forms a variable pressure chamber 85. The valve housing 82 is provided with radial ports 86 communicating between the chamber 85 and an annular groove 87 formed around the valve sleeve 83. This sleeve is provided with a second annular groove 88 communicating through radial passages 89, formed in the head 74, with an annular vacuum space 90 formed between the head 74 and cap 77.

The vacuum space 90 communicates through a nipple 91 with one end of a preferably flexible line 92 (Figure 1) and the other end of this line is connected to a suitable source of vacuum.

Referring to Figure 6, the cap 77 is preferably horizontally elongated and its shape generally corresponds to the cross-sectional shape of the bellows 73. The central portion of the cap is spaced from the body of the head 74 to receive an annular air cleaner 94 and the cap is provided with atmospheric openings 95 to admit air to the air cleaner 94. From the air cleaner, the air flows into an annular space 96 surrounding the adjacent end of the valve sleeve 83, and such sleeve is provided with radial ports 97 for the admission of air into the interior of the sleeve.

A spool valve 100 is slidable in the sleeve 83 and is provided with spaced lands 101 and 102 forming therebetween an annular groove 103 normally communicating with the annular groove 87 through ports 104 formed in the sleeve 83. The valve 100 is provided with ports 105 communicating between the groove 103 and the interior of the valve. Obviously, the interior of the valve 100 is always open to the atmosphere through ports 97. The valve is provided with a third land 106 forming with the land 101 an annular groove 107 movable in the operative positions of the parts to communicate with the ports 104 (Figure 2). The groove 107 is normally disconnected from such ports, as shown in Figure 1. The groove 107 is in fixed communication with the groove 88, forming a vacuum space, through ports 108 formed in the sleeve 83. The valve 100 is biased to the operative position shown in Figure 2 by a spring 110. The spring 36 (Figure 1) normally overpowers the spring 110, as will become more apparent, thus tending to retain the valve 100 in its normal position, shown in Figure 1, against the tension of the spring 110.

The valve housing 82 has preferably integral axial projection 114 received in an axial recess in a tubular piston rod 115 projecting through the stationary motor head 66. As shown in Figure 3, the retaining cup 71 is provided with a cylindrical inner portion 116 housing a suitable bearing and packing means, including, for example, a resilient packing 117 and a bearing member 118, which latter member may be a rawhide packing element. The bearing and sealing means permits the rocking of the rod 115, as will become apparent.

Figure 4:
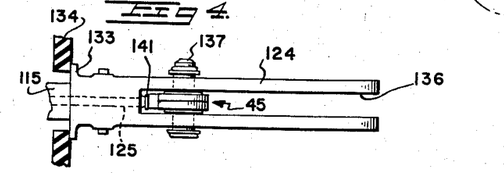
Figure 4 is a detail plan view of the clevis connections between the front brake motor piston rod and the reaction lever and valve controlling element.

The rod 115 has a reduced end secured in a recessed clevis rod 124. Through the extension 114 and rod 115 projects a valve control rod 125, the left-hand end of which (Figure 2) engages against the adjacent end of the valve 100. On the right-hand end of the rod 125 is arranged a nylon or similar cap 126 shouldered as at 127 to limit its movement outwardly of the member 124. It will be apparent that the spring 110 biases the valve 100 to the motor energizing position shown in Figure 2, and when the valve is in such position its control rod 125 and cap 126 will occupy the positions shown in Figures 2 and 3. A spring seat 130 is arranged in a bellows 73 against the adjacent portion of the head 74. A motor return spring 131 is seated at one end against the spring seat 130 and has its opposite end engaging the retaining cup 71, as shown in Figure 3. When the motor 65 is deenergized, the return spring 131 maintains the bellows 73 extended. Movement of the motor head 74 to the left to the position shown in Figure 1 is limited by bosses 133 (Figure 4) engaging a bumper 134 clamped between the head 66 and the bracket 68.

The upper ends of the lever members 46 extend into a slot 136 formed in the clevis bar 124. A transverse pin 137 is carried by the adjacent ends of the lever members 46 and extends laterally into slots 138 formed in the bar 124, the pin 137 normally being arranged in the left-hand ends of the slots 138 as shown in Figure 1. When the piston rod 115 moves to the right (Figure 3) the left-hand ends of the slots 138 transmit movement to the pin 137 and thus to the upper end of the lever 45 to move the latter to the right.

The bracket 32 is provided at its upper end with a transverse offset 140 projecting into the slot 136 and curved as at 141 to form a contact element always in engagement with the cap or thimble 126 in the normal operation of the apparatus. It will become apparent that upon a failure of power in the motor 65, the upper end of the lever construction will move to the right and thus move out of contact wtih the thimble 126.

As previously stated, the master cylinder 14 is connected solely to the front wheel cylinders 62. A separate master cylinder 150 (Figures 1 and 7) is provided for the rear wheel cylinders. As shown in Figure 1, the master cylinder 150 is connected by suitable lines 151 to the rear wheel brake cylinders 152. The master cylinder 150 also has a conventional fluid displacing plunger (not shown) operative by a push rod 153.

In accordance with the present invention, the master cylinder 150 is operated solely by a fluid pressure motor and has no pedal forces transmitted thereto. The motor for operating the master cylinder 150 is shown in detail in Figure 7 and is indicated as a whole by the numeral 156. This motor is similar to the motor 65 in that it is of the bellows type. The motor 156 comprises, therefore, a bellows 157 one end of which is provided with a bead 158 fixed with respect to a stationary motor head 159. This head is formed of outer and inner plates 160 and 161 the peripheral portions of which are shaped as in Figure 7 to form clamping flanges engageable with the bead 158. The other end of the motor is provided with a pressure movable head 163 comprising outer and inner plates 164 and 165, also having their outer peripheries forming clamping flanges engageable with a bead 166 formed on the adjacent end of the bellows 157.

The stationary head members 160 and 161 cooperate to receive and support suitable bearing and sealing means preferably comprising a resilient packing and sealing member 168 backed up by a bearing 169 which, if desired, may be made of rawhide. A power operable rod 171 is secured as at 172 to the head 163 axially thereof. The rod 171 projects entirely through the motor 156, being slidable in the bearing and sealing means referred to and projecting beyond the head 159 through an opening 173 in a supporting bracket 174. The opening 173 is larger than the rod 171 for free movement of the latter to partake of rocking movement incident to axial movement of the rod 171 under operating conditions which will become apparent. The bracket 174 may be of any desired type and is shown as being provided with a lower foot portion 175 in Figure 7, which portion of the bracket may be secured to any suitable stationary part of the vehicle, for example, one of the side frame members thereof. The bracket 174 is bolted as at 178 to the head 159 and, accordingly, it will be apparent that this head is fixed in position to become the stationary head of the motor 156.

Figure 7:
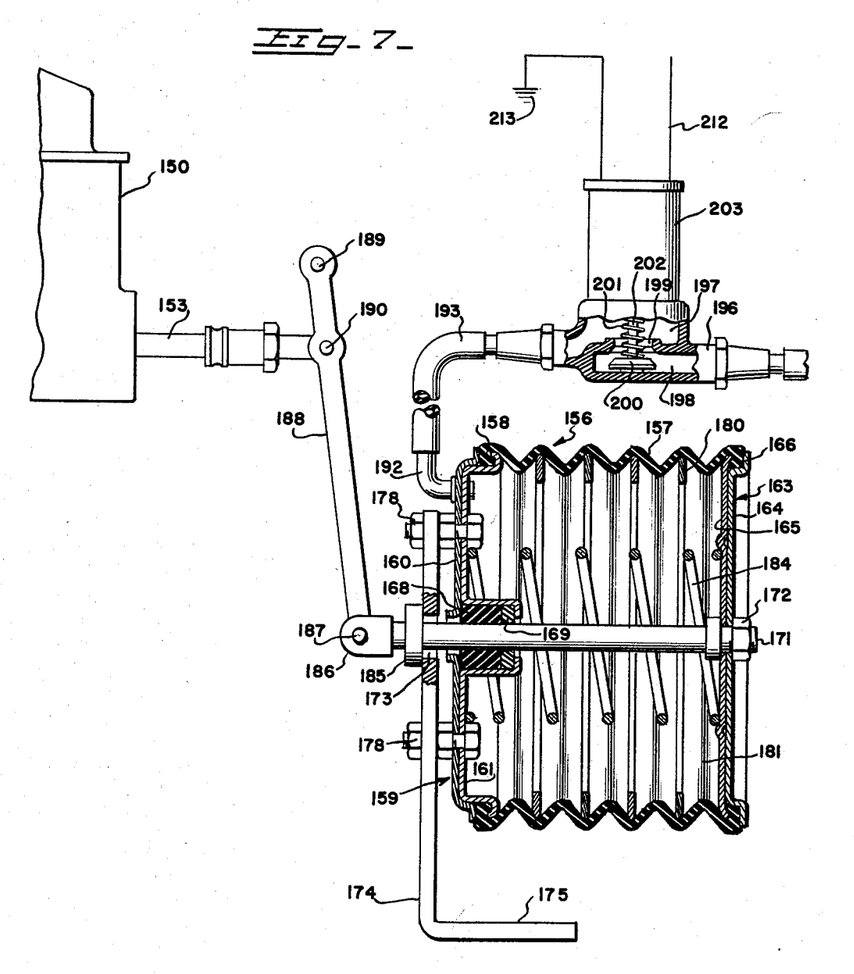
Figure 7 is an enlarged sectional view of the rear wheel brake motor and associated elements shown with the parts in normal inoperative positions, parts being shown in elevation.

The bellows 157 is preferably provided with subtending rings 180 to prevent the radial collapsing of the bellows when the interior chamber 181 is connected to the source of vacuum, in a manner to be described, to move the head 163 to the left in Figure 7. To normally maintain the head 163 in its inoperative position shown in Figure 7, a return spring 184 is arranged coaxially within the bellows and engages at opposite ends against the heads 159 and 163. To limit movement of the head 163 to its normal inoperative position, the rod 171 is provided with a stop collar 185 engageable against the bracket 174. A yoke 186 is carried by the left-hand end of the rod 171 and is pivoted as at 187 to the adjacent end of a lever 188. This lever is supported for turning movement on a fixed axis 189 and is pivotally connected as at 190 to the master cylinder piston push rod 153, this pivotal connection being substantially identical with the corresponding connection shown in Figure 5.

The stationary head 159 of the motor is provided with a fluid connection 192, preferably in the form an elbow having one end carried by and projecting through the head 159 to communicate with the motor chamber 181. The other end of the elbow 192 is connected by a pipe line 193, preferably in the form of a rubber hose, to a fluid connecting nipple 194 (Figures 1 and 3) leading into the motor chamber 85 of the motor 65. It will become apparent, therefore, that the exhaustion of air from the motor chamber 85 operates through the pipe line 193 to exhaust air from the motor chamber 181 to render the motor 156 operative.

An inertia controlled valve 196 is interposed in the pipe line 193. This valve comprises a housing divided to form upper and lower chambers 197 and 198 normally in open communication with each other through a seated port 199 adapted to be closed by a normally open valve 200, biased to open position by a spring 201. The stem 202 of the valve 200 forms a part of the armature of a solenoid 203 which is normally de-energized, whereby the valve 200 normally remains open as shown in Figure 7.

A circuit for the solenoid 203 is shown in Figure 1. A source of current such as the vehicle battery 205 has one side grounded as at 206 and has its other terminal 207 leading to a contact 208 in a tube 209 containing a body of mercury 210. A second contact 211 in the mercury tube is connected by a wire 212 to one terminal of the solenoid 203, the other terminal of the solenoid being grounded as at 213. Referring to Figure 1, it will be noted that the left-hand side of the figure is toward the foward end of the vehicle, and it will be obvious therefore that the mercury switch 209 slopes upwardly and forwardly. Under normal operating conditions referred to, including normal braking to decelerate the vehicle from average speeds, the body of mercury 202 will remain in the lower rear end of the tube 209, and in any event, under such circumstances, will not close the circuit across contacts 208 and 211.

*Operation*

In the normal positions of the parts, the brake pedal 25 occupies a solid line position shown in Figure 1. The valve groove 103 communicates with ports 104 and thus with the motor chamber 85. The valve groove 103 communicates through ports 105 with the interior of the valve 100 which is always open to communication with the atmosphere, as stated. The valve land 101 will be to the left of the ports 104 (Figure 1) and, accordingly, the vacuum ports 108 will communicate only with the valve groove 107. Therefore, atmospheric pressure will be present in the motor chamber 85.

The spring 36 is stronger than the spring 110. Therefore when the parts are released, the spring 36 maintains the bracket arm 32, and consequently the brake pedal 25, in the solid line position shown in Figure 1, and the valve control finger 141 maintains the valve 100 in the off position shown in Figure 1. The valve 100 is maintained in such position against the tension of the spring 110.

To operate the apparatus, the pedal pad 27 is depressed and the pedal lever 25 rocks about the pivot of the shaft 20, moving the bracket 32 against the tension of the spring 36 and relieving pressure between the finger 141 and rod 125. The spring 110 will then move the valve 100 to the right from the position shown in Figure 1, cutting off communication between the groove 103 (Figure 2) and the ports 104 and opening communication between such ports and the groove 107. The latter groove is always connected to the source of vacuum through ports 108. Since the ports 104 are in fixed communication with the motor chamber 85, air will be exhausted from such chamber and the motor head 74 will be moved to the right from the position shown in Figure 1 by atmospheric pressure.

Thus the motor will be energized and the piston 115 will be moved to the right as viewed in Figures 1, 2 and 3. The left-hand ends of the slots 138, engaging the pin 137, will rock the lever 45 in a clockwise direction. This lever is pivoted to the brake lever by the pin 51. Forces thus will be transmitted directly by the motor through lever 45 to operate the master cylinder push rod 16, which reacts against the brake lever 25 through pin 51 to tend to resist rotational movement of the brake pedal. Accordingly, the operator is caused to perform part of the work of applying the front wheel brakes through the pin 51, and this pin serves also to react against the brake pedal in proportion to the reaction forces transmitted to the pin 58 by the master cylinder push rod.

It will be noted that the master cylinder 14 delivers hydraulic fluid pressure through lines 61 solely to the front wheel brake cylinders 62. The hydraulic pressure thus developed will be the sum of the forces delivered to the push rod 16 by the motor 65 and brake lever 25.

When the motor has been energized to its maximum extent, additional foot pressure applied to the brake pedal will take up play between the sleeve 41 (Figure 5) and the slot 60, whereupon the levers 25 and 45 will move as a unit and the operator may apply to the push rod 16 forces limited only by his ability to depress the brake pedal 25. Accordingly, there is no fixed limit to hydraulic pressures which can be developed in the front wheel cylinders 62.

The operation of the valve mechanism as referred to above exhausts air from the motor chamber 85, which chamber, except under the extreme conditions referred to below, is in fixed communication with the chamber 181 of the motor 156 through pipe line 193. Therefore, air also will be exhausted from the motor chamber 181, and the motor head 163 will move to the left in Figure 7 to transmit movement through rod 171 to the lever 188 to actuate the push rod 153. This operation causes hydraulic fluid under pressure to be transmitted through lines 151 to the rear brake cylinders 152.

Particular attention is invited to the fact that the generation of hydraulic pressures in the master cylinder 150 is wholly independent of any forces transmitted to the pedal lever 25, the latter lever affecting the master cylinder 150 only through its releasing of the valve 100 for the functioning thereof in the manner described above. In other words, pressures generated in the master cylinder 150 will be wholly dependent upon energization of the motor 156, and the hydraulic pressures will be limited to those delivered when the motor 156 is energized to a maximum extent.

As is well known, the brake systems of conventional passenger vehicles are so designed that 60% of brake applications occurs at the front wheels and 40% at the rear wheels. The front wheel brakes can be applied to a greater extent than the rear brakes without locking the wheels because of the very substantial weight carried by the front end of a motor vehicle. It is relatively easy, as is well known, to lock the rear wheels so that they slide over the supporting surface, and such loss of traction results in a loss in braking effect. Moreover, it is the tendency of a motor vehicle operator when the rear wheels lock to ease up on the brake pedal to release the rear wheels for turning movement. In so doing, effective braking is lost at the front wheels.

With the present apparatus, the effective braking at the rear wheels is limited in accordance with maximum energization of the motor 156, and this limit applies regardless of how much pressure is applied to the brake lever 25. For normal braking, that is, for effecting normal vehicle deceleration rates from normal vehicle speeds, the rear wheels will not lock, and under such conditions the mercury 210 (Figure 1) will remain in or close to the rear end of the tube 209. Thus the solenoid 203 will remain de-energized and the valve 200 will remain open. The application of the rear wheel brakes, accordingly, will take place in accordance with the foregoing description.

Assuming that the vehicle is traveling at a relatively high speed and the operator makes a so-called "panic" stop, substantially full force will be applied very rapidly to the pedal 25. The front wheel brakes under such conditions will be applied in accordance with the maximum energization of the motor 65 plus the maximum foot pressure applied to the pedal pad 27. Thus the greatest possible effective braking action is provided at the front wheels. Since foot pressures are effective only at the front wheels, the utilization of such force is far more effective than when divided among all four vehicle wheels.

Under the conditions described above, the rear wheel brakes also will be applied, but not to the maximum extent. When vehicle deceleration occurs above a predetermined rate, the body of mercury 210 will be caused to move forwardly or to the left in Figure 1 by its own inertia, and thus it will bridge across the contacts 208 and 211 to energize the solenoid 203. This action causes the valve 200 to be closed, thus preventing the further exhaustion of air from the motor chamber 181, and accordingly the motor 156 will not be energized to its maximum extent and the locking of the rear vehicle wheels will be prevented. The maintenance of traction of the rear wheels with the highway, however, provides the greatest possible rear wheel braking effect which can be obtained without locking the wheels. Moreover, the closing of the valve 200 provides for a slightly more rapid complete exhaustion of air from the chamber 85 of the motor 65, thus providing a slightly faster application of the front wheel brakes, which brake application takes place to the maximum possible extent determined by the driver's ability to exert force against the pedal lever 25. The present system thus is highly advantageous in effecting the greatest possible rate of vehicle deceleration under such conditions.

It also will be apparent that there will be an extremely small time lag between the application of the front brakes and the application of the rear brakes, which is highly advantageous. While this delay is harly measurable, it insures against instantaneous application of the rear brakes with the possible locking of the rear wheels, particularly under emergency braking conditions. This very slight time lag occurs by virtue of the fact that the motor 156 is usually remote from the motor 65 and a certain amount of line friction is present in the pipe line 193.

After the apparatus has been operated and the pedal has been released, the parts will return to normal positions in an obvious manner. The spring 36 will swing the finger 141 to the left to the position shown in Figure 1, and the pedal pad 27 likewise will return to its normal position. Movement of the finger 141 in the manner described will return the valve 100 to its normal position against the tension of the spring 110, and the motor chamber 85 will be opened to the atmosphere. Similarly, air will be admitted into the motor chamber 181 of the rear brake motor 156 through the pipe line 193. The return springs 131 and 184 of the two motors will return the movable heads of the motors to their normal positions.

Assuming that a failure in power occurs, for example if the vehicle engine stalls, the front wheel brakes can be applied by depressing the pedal pad 27. This operation will take up play between the sleeve 41 (Figure 5)

and the slot 60, whereupon the levers 25 and 45 will turn as a unit to effect movement of the push rod 16. Thus the front wheel master cylinder 14 will be operated to apply the front wheel brakes. The braking action thus provided obviously is much less effective than when the apparatus functions normally, but at least provides some means by which the vehicle can be brought to a stop. Since all of the pedal generated forces will be applied to the front wheels, however, the braking action is more effective than if divided among all four vehicle wheels. Moreover, this action is rendered more effective in view of the fact that under the conditions referred to the pin 137 is freely movable in the slot 138, to the right from the position shown in Figure 1, the operator not being called upon to actuate the movable motor head 74 against the tension of the relatively heavy spring 131. Accordingly, more of the foot-generated forces are utilized for applying the front wheel brakes.

Attention is invited to the fact that the rear brake motor 156 is placed at any convenient point, and such point usually will be beneath the body of the vehicle with the bracket 174 secured to one of the vehicle side frames. Therefore, the motor 156 is exposed far more openly to road dust and dirt than is true of the motor 65. This makes no difference so long as foreign matter is not permitted to accumulate inside the motor. The present system makes it practicable to mount the motor 156 in the manner stated and to fully protect the interior of the motor from any accumulations of foreign matter. The valve mechanism is carried by the motor 65 and is supplied with air through the air cleaner 94, and accordingly the valve mechanism is fully protected from grit or other foreign material and such material cannot find its way into the motor 65. The motor 156 for the rear wheels is completely sealed except for the pipe line leading to the motor 65. Therefore, air entering the motor 156 is also filtered, and there can be no dust or foreign material which might flow back and forth between the motors through the connecting pipe line incident to the aspirating action of the motors. In other words, if any dust or gritty material could find its way into the motor 156, the opening of the interior of the motor 156 to the source of vacuum through the motor 65 might result in such dust being pulled into the motor 65 to lodge around the control valve and interfere with the action thereof. The single air cleaner thus serves for both motors and permits the mounting of the motor 156 at any remote point where it conveniently can be installed, even though the exterior of the motor is exposed to road dust, etc.

The present construction is relatively simple, the types of air-suspended bellows shown being capable of economical manufacture. Moreover, the mounting of the motor 65 in the position shown is relatively easy, space usually being available forwardly of the fire wall 10 above the master cylinder 14. The motor 156 and its master cylinder 150 may be arranged at any point where space is available in the vehicle, thus materially simplifying any installation problems.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism for a motor vehicle having a plurality of sets of wheel cylinders, a first hydraulic chamber communicating with one set of wheel cylinders, a second hydraulic chamber communicating with the remaining wheel cylinders, a first elastic fluid pressure motor having a pressure responsive unit having connected thereto a fluid displacing member extending into said first hydraulic chamber, a second elastic fluid pressure motor having a pressure responsive unit, a power lever connected to such pressure responsive unit and connected to a second fluid displacing member projecting into said second hydraulic chamber, each of said motors being of the air-suspended type and each having a variable pressure chamber, a duct directly connecting said variable pressure chambers, a control valve mechanism having fluid connection with one of said variable pressure chambers and with the atmosphere and with a source of vacuum, said valve mechanism normally connecting said one variable pressure chamber to the atmosphere, control means connected for operating said valve mechanism comprising a pedal connected to said valve mechanism and movable from a normal position to operate said valve mechanism to connect said one variable pressure chamber to said source of vacuum, said pedal being movable from a normal off position independently of said power lever for operating said valve mechanism and being connected to said power lever to assist the latter in operating said second fluid displacing member upon energization of said motor, and inertia-controlled means comprising a valve in said duct connected to be responsive solely to a predetermined rate of vehicle deceleration for substantially closing said duct.

2. A mechanism according to claim 1 wherein said inertia controlled means comprises a spring connected to bias said valve to open position, a normally de-energized solenoid connected to said valve, and a circuit for said solenoid comprising a normally open mercury switch connected to be closed when vehicle speed deceleration exceeds a predetermined rate.

3. A booster brake mechanism for a motor vehicle having rear wheel cylinders and front wheel cylinders, a first hydraulic chamber connected to the rear wheel cylinders, a second hydraulic chamber connected to the front wheel cylinders, a first fluid motor having a pressure responsive unit provided with a fluid displacing element projecting into said first hydraulic chamber, a second motor having a pressure responsive unit, each motor having a variable pressure chamber, a duct connecting said variable pressure chambers, a valve mechanism having fluid connection with the variable pressure chamber of said second motor and with the atmosphere and with a source of different pressure and having a normal off position connecting such variable pressure chamber to the atmosphere, a pedal lever and a power lever supported for pivoted movement, a fluid displacing element connected to said power lever and projecting into said second hydraulic chamber, said power lever being connected to the pressure responsive unit of said second motor, power transmitting means so connected that said pedal lever assists said power lever in operating the fluid displacing element projecting into said second hydraulic chamber when said second motor is energized and whereby such movement of said pedal lever is resisted, said pedal lever being connected to said valve mechanism and being movable independently of said power lever to move said valve mechanism from said normal off position to connect the variable pressure chamber of said second motor to said source of different pressure to move said power lever and render said motion transmitting means operative, a normally open valve in said duct, and means responsive to a predetermined rate of vehicle deceleration for closing said normally open valve.

4. A booster brake mechanism for a motor vehicle having a set of rear wheel cylinders and a set of front wheel cylinders, a hydraulic chamber connected to each set of wheel cylinders and having a fluid displacing plunger therein, a first and a second fluid motor each having a pressure responsive unit mechanically connected to one of said plungers and provided at one side thereof with a variable pressure chamber, a duct connecting said variable pressure chambers, a valve mechanism in one of said motors coaxially thereof and having a coaxial operating rod, said valve mechanism having fluid connection with the variable pressure chamber of said one motor and with sources of different pressures and having an off position normally connecting such variable pressure chamber to one of said sources, a pedal having mechanical connection with said rod, said valve mechanism being movable from said off position to connect the variable pressure chamber of said one motor to said other source to energize said motors, means operative after energization of said one motor for transmitting forces from said pedal to the associated plunger whereby said pedal performs part of the work in operating said associated plunger and movement of said pedal is resisted, said pedal being initially movable from a normal off position independently of said means, a normally open valve in said duct, a normally de-energized solenoid connected to said valve, and a circuit for said solenoid comprising a normally open mercury switch arranged to be closed when vehicle deceleration increases to a predetermined point.

References Cited in the file of this patent

UNITED STATES PATENTS

| | | |
|---|---|---|
| 1,650,488 | Bragg et al. | Nov. 22, 1927 |
| 1,826,414 | Bragg et al. | Oct. 6, 1931 |
| 2,242,297 | Freeman | May 20, 1941 |
| 2,336,342 | Brewer | Dec. 7, 1943 |
| 2,402,344 | Price | June 18, 1946 |
| 2,407,097 | Porter | Sept. 3, 1946 |
| 2,685,172 | Price | Aug. 3, 1954 |
| 2,726,739 | Jeanson | Dec. 13, 1955 |
| 2,747,697 | Banker | May 29, 1956 |
| 2,751,575 | Jacobs et al. | June 19, 1956 |
| 2,791,203 | Ayers | May 7, 1957 |
| 2,845,147 | Hill | July 29, 1958 |